Feb. 24, 1942. R. ROCHESTER 2,273,994
MACHINE AND PROCESS OF MAKING SLIDE FASTENER STRINGERS
Filed Nov. 14, 1938 4 Sheets-Sheet 2
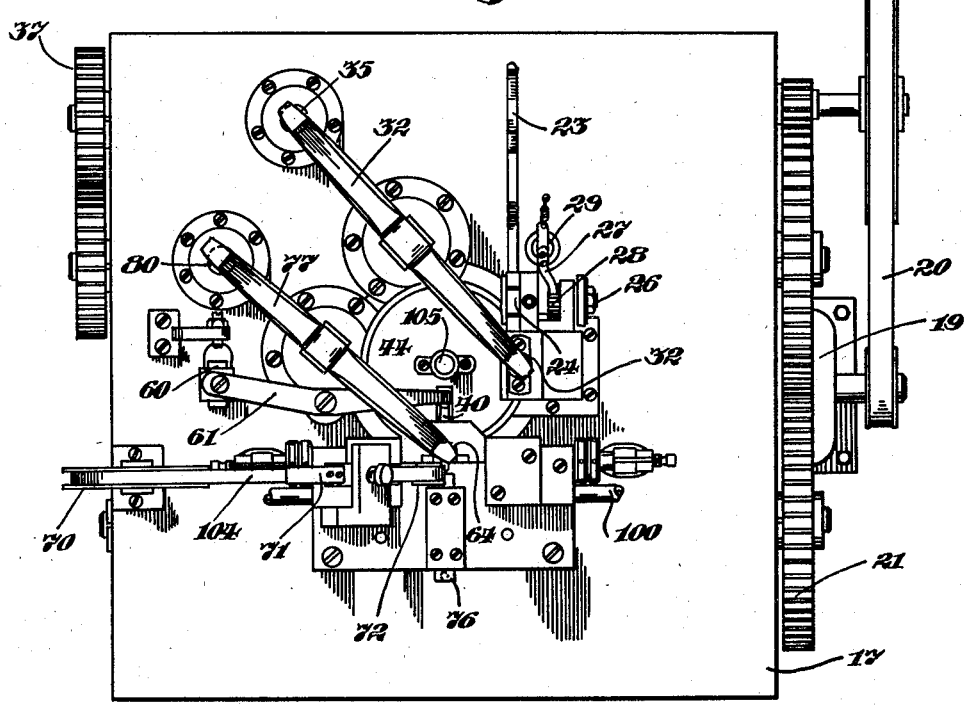
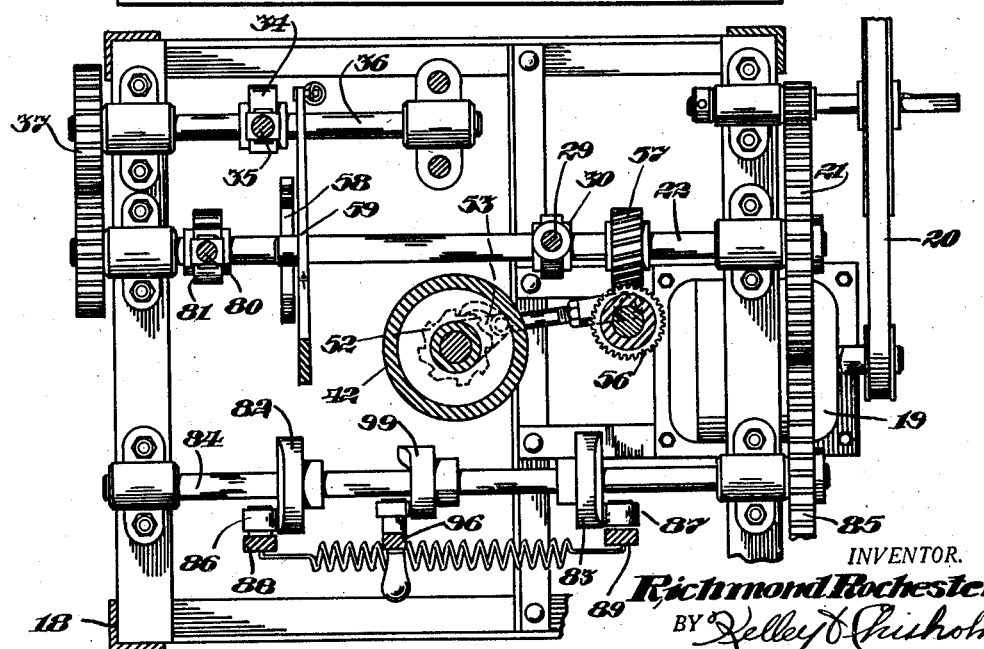
INVENTOR.
Richmond Rochester
BY Kelley & Chisholm
ATTORNEYS.

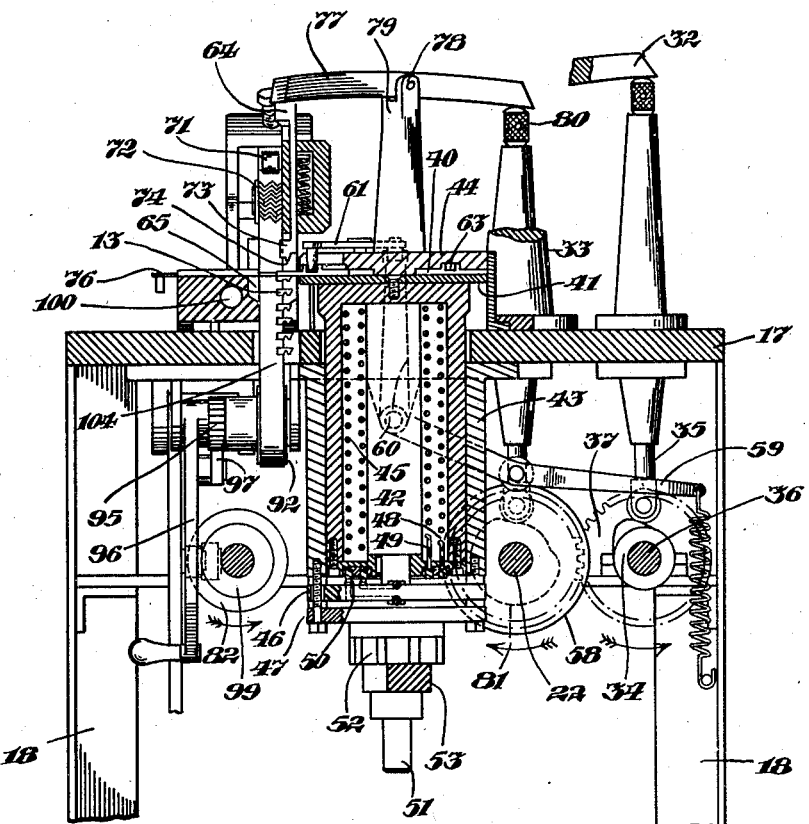

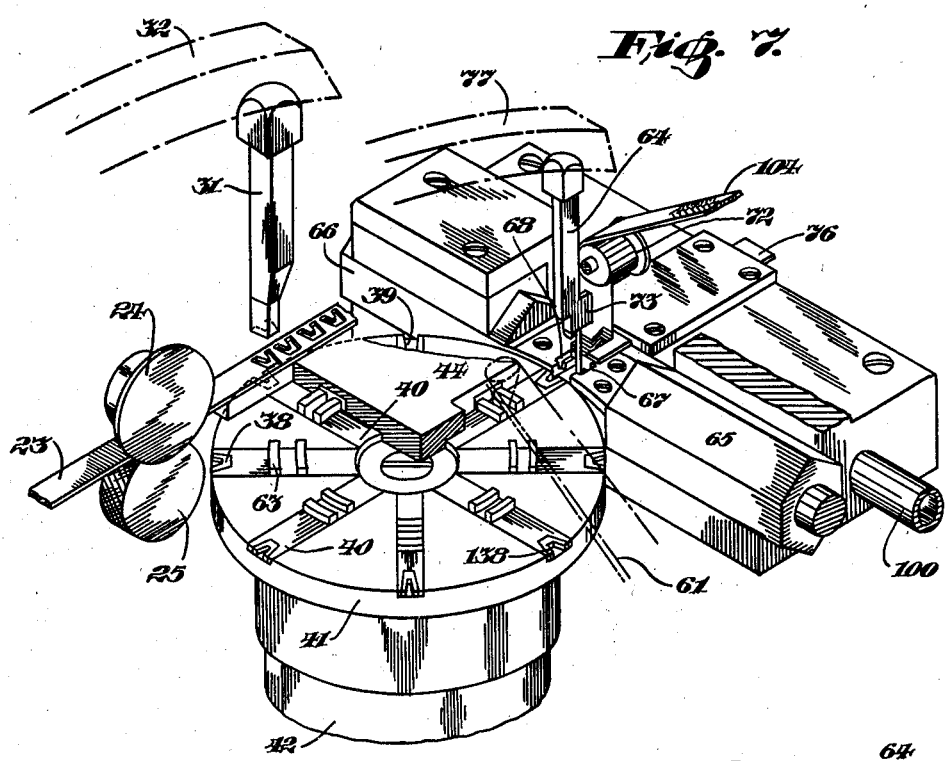
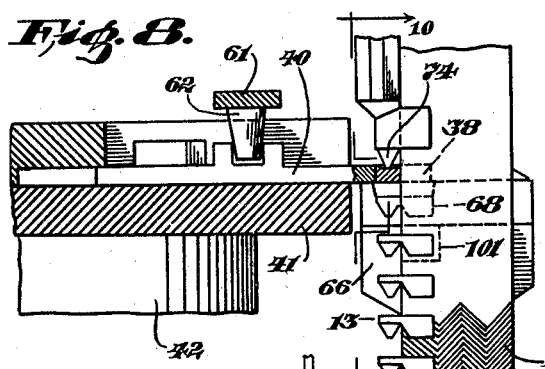
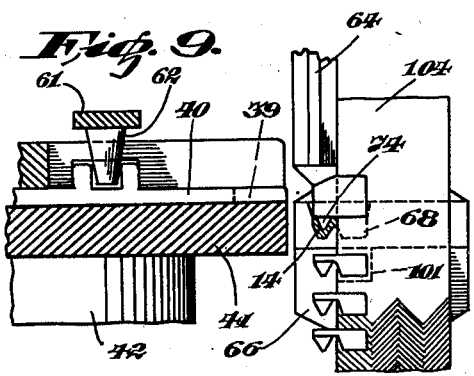
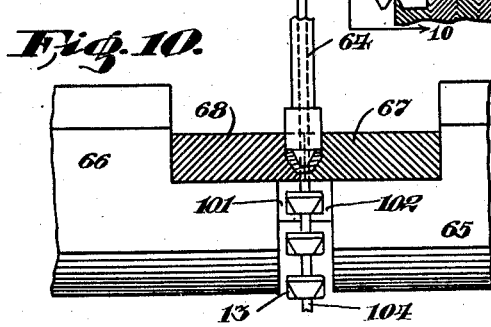
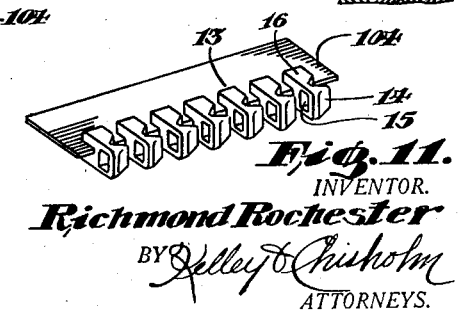

Patented Feb. 24, 1942

2,273,994

UNITED STATES PATENT OFFICE 2,273,994

MACHINE AND PROCESS FOR MAKING SLIDE FASTENER STRINGERS

Richmond Rochester, Long Island City, N. Y., assignor to Talon, Inc., Meadville, Pa., a corporation of Pennsylvania Application November 14, 1938, Serial No. 240,276

14 Claims. (Cl. 18—1)

My invention relates to improved processes and machines for making slide fastener stringers especially from plastic materials.

In the manufacture of slide fastener stringers the problem generally speaking, is to form and apply at relatively low cost a large number of small accurately formed fastener members on the edge of a fabric stringer in accurately spaced relation. While slide fasteners made from plastic materials have been on the market during recent years, the bulk of the market is still supplied with metal fasteners. Recognizing the many advantages of plastic material in slide fasteners, there have been various proposals for manufacturing them, some of which are more or less successful.

One of the objects of my invention is to provide an improved machine and process for making slide fastener stringers in which the fastener members are of plastic material, wherein the entire process is carried out in one automatic machine with a view to reducing the cost of manufacture as much as possible. I am aware that it has been proposed to form the fastener members on the tape by injection molding one at a time and even gang molding processes have been suggested in which the material might be placed in the molds in some way and the molds heated to render the material plastic, and then later cooled.

My invention contemplates first producing the fastener member blanks in any suitable way and then pre-heating the same until they are sufficiently soft so that they can be die-formed but cannot flow at normal pressures, and afterward quickly die-forming them. If the blanks are at a temperature where they can be formed and still not require a great amount of cooling to enable them to retain their shape, they can be handled one at a time in my improved automatic machine at a surprisingly rapid rate.

In my improved process and machine I contemplate the use of various known plastics and at the present time, cellulose acetate has been found the most satisfactory.

My invention is adaptable also to make fastener stringers in which the fastener members consist of phenol-formaldehyde resins such as "Bakelite." In the use of these latter resins the blanks may be formed from material in semi-cured state and the pre-heating operation will substantially reduce the time for the final curing and setting in the forming dies. In view of the rapid progress being made in the art of plastics it is expected that new plastic materials will be developed which will be even more satisfactory in my improved process and machine. If such improved plastics are developed their possible use will be readily apparent to those skilled in the art. It is also possible with my invention partially to mold the fastener members from granular material of either thermo-setting or thermo-plastic variety until they are partially cured and then placing them in a heated condition in the mold which molds them on the tape.

An important advantage of my process over prior molding processes where the entire element was molded in direct contact with the tape, resides in the fact that there are no fins or flashes. This is due to the fact that the blank is in a preformed state when it enters the molding die and its plasticity is such that it will not tend to flash in a tiny crack between the dies or flash along the tape.

In the accompanying drawings I have shown for purposes of illustration, one embodiment which my invention may assume in practice. In these drawings:

Fig. 2 is a plan view;

Fig. 3 is a plan view with the table top removed to show the gearing and cam shafts;

Fig. 4 is a central vertical sectional view;

Fig. 5 is a perspective view showing portions of the blank forming mechanism;

Fig. 6 is a detailed view of the blank forming punch;

Fig. 7 is a perspective diagrammatic view showing the working parts;

Fig. 8 is a detail sectional view showing the transfer punch and die forming punch;

Fig. 9 is a view similar to Fig. 8 showing the parts in another position;

Fig. 10 is a cross-section on line 10—10 of Fig. 8; and

Fig. 11 is a perspective view of a section of the finished product.

Figure 1:
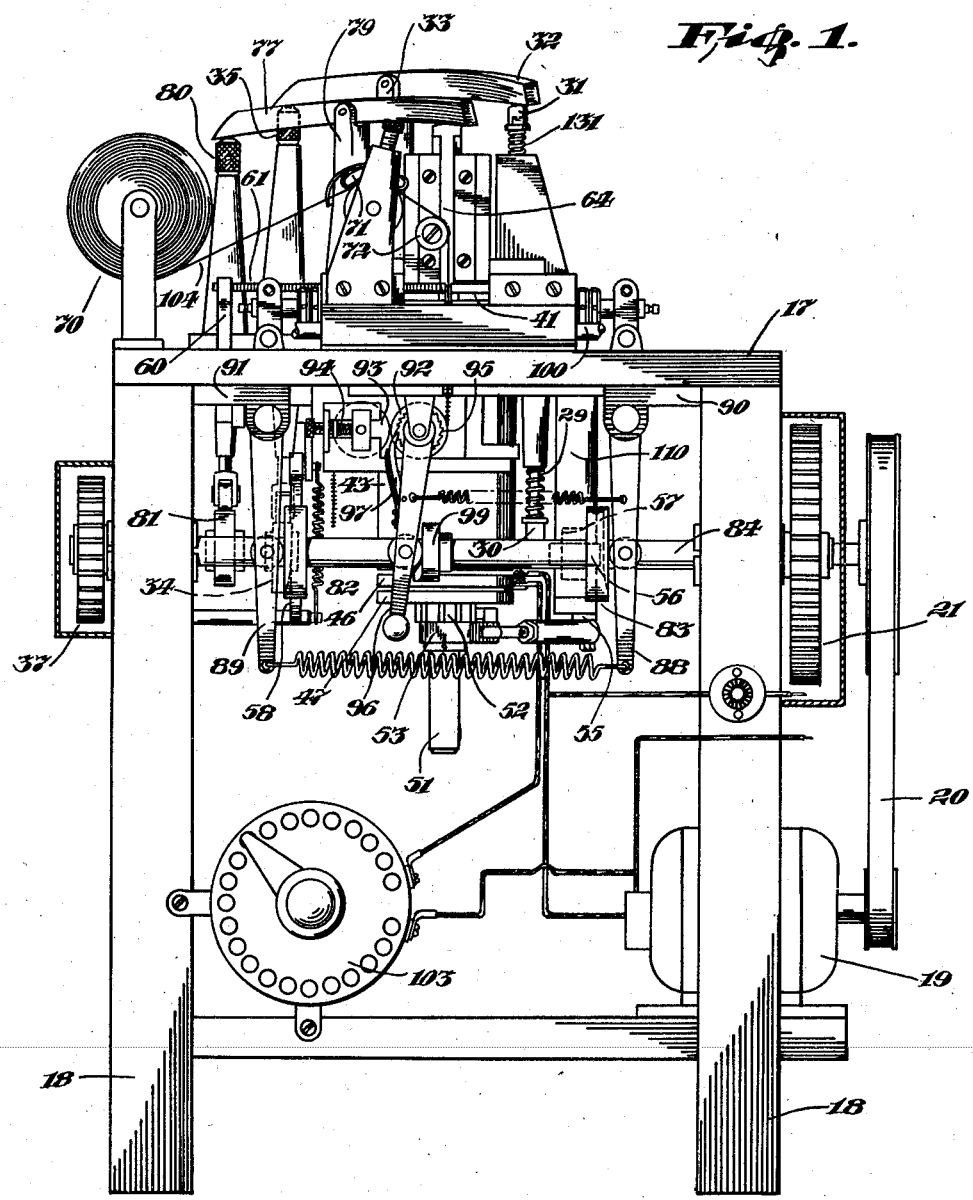
Fig. 1 is a front elevation view of the machine.

The fastener stringer of the character which it is desired to form comprises usually a fabric stringer 104, having a series of fastener members 13 in closely spaced relation along one edge. Each fastener member has a projection 14 on one side and a correspondingly shaped recess or pocket 15 on the opposite side, and jaws or base portions 16 which extend over the tape for the purpose of holding the fastener member firmly in position on the tape. Generally the machine comprises a table top 17 supported on legs 18. It is driven from any suitable source of motive power such as an electric motor 19 through a belt 20, gearing 21, and main shaft 22.

While any suitable method and mechanism may be used to make the desired shape of blanks, the illustration shows a strip 23 being fed into the machine between rolls 24 and 25. The stepwise feed of the strip is accomplished by a conventional type of ratchet and pawl mechanism not shown in detail. The roll 25 is carried on a shaft 26 and the pawl and ratchet are indicated at 27, 28, respectively. The pawl member 27 is operated by means of a tappet rod 29 which rides against a cam 30 on the main shaft 22. On each revolution of the main shaft 22 the strip advance mechanism operates to advance the strip one step under the blanking out punch. The punch 31 is mounted directly over the strip and is operated by means of a rocker arm 32, which is pivoted in a saddle standard 33 secured to the table top 17. The rocker arm is actuated by means of a cam 34 acting through a rod 35, and the spring 131 returns the punch. Cam 34 is mounted on a shaft 36 which is geared by suitable gearing 37 to the main shaft 22. The strip is advanced into the machine and under the blanking out punch 31 which blanks out from the strip a fastener member blank 38 and in the same operation sets the blank into a crotch 39 in one of the transfer fingers 40.

The blank 38 may take various shapes but preferably has a shape that will require the minimum movement of material in the final die-forming operation. Accordingly, it is preferably formed of generally Y shape, the arms 138 of the Y being intended to form the bases or jaws 16 of the finished fastener member.

In the illustrated form of the invention there are eight of the transfer fingers 40 radially disposed on the dial 41. A heating cylinder 42 is turned in a bearing 43 which is secured underneath and to the table top 17. Within the heating cylinder 42 is arranged any suitable heating element such as electric resistance coils 45. Secured to the bearing 43 at its lower end is contact ring 46 and base plate 47. Electric wires are connected to the ring as at 48 and 49, and connection with the resistance heating coils within the heating cylinder is completed by means of brush contacts 50. The heating characteristics of the cylinder are regulated by means of a conventional type of rheostat such as 103. Means for determining the temperature in the cylinder may be provided by inserting in any convenient point such as on top of the cylinder, a conventional type of thermometer 105 or a thermocouple. A cover plate 44 substantially covers the dial and is suitably fastened to the table top. If the pre-heated blanks are to be formed of granular material the die cavities will be closed and held under pressure by an automatic closure punch, for example, during the pre-heating stage. If thermo-setting resins are used in this process, the heat is such that the curing will progress only to an intermediate stage so that the curing can be completed after the fastener member blank is in contact with the tape.

A shaft 51 is secured to the heating cylinder in any suitable manner and serves to rotate the cylinder for moving the transfer fingers in proper timed relation in the operation of the machine. On the shaft 51 is secured a ratchet 52 which when eight fingers in the die plate are used, will have eight ratchet teeth being acted upon by a pawl 53 and a suitable ratchet lever 54. The pawl 53 is operated by an eccentric 55 which is secured to a gear 56 mounted on a standard 110 secured to the table top 17. The gear 56 engages a gear 57 on the main shaft 22. This ratchet mechanism operates to advance the heating cylinder one-eighth of a revolution for each cycle of the machine.

After the blanking out punch has set a blank in the transfer finger in the die plate and has retracted to its initial position, the ratchet mechanism 53 operates to advance the heating cylinder one-eighth of a revolution. In the initial operation of the machine after this has occurred, a sufficient number of times to fill the crotches of the transfer fingers with fastener member blanks, a quick transfer cam 58 operating through a lever 59 and a suitable toggle 60 or bell crank, swings horizontally a lever 61 which is pivoted to the table top on a vertical axis. The lever 61 has a projection on one end and this projection extends through a slot in the top plate 44 and engages a track 63 on the transfer fingers 40. When the heating cylinder has rotated to move a transfer finger under this slot, the projection on the arm 61 engages the track at which instant the quick acting cam operates the lever 61 to move the transfer finger outwardly from the die plate 41. The transfer finger in this manner moves the fastener member blank from the pre-heating chamber under a forming punch 64 and between die blocks 65 and 66, respectively. At the same time the transfer punch has the element in this position, the die forming punch 64 descends and pushes the element 38 downwardly into the die cavity. The die blocks 65 and 66 which carry the respective die cavities 67 and 68 close in on the element and embrace it as the die forming punch descends to transfer the element 38 into the final mold cavity. The die blocks remain in this inward position approximately five-thousandths of an inch apart, embracing the sides of the fastener elements until the die forming punch has descended to its lowermost position and then the die blocks completely close together and mold the finished fastener element 13 in firm engagement on the tape. The punch 64 is large enough to fill the top of the die cavity and put heavy pressure on the plastic material therein. The cavity is so shaped as to conform to the desired shape of fastener member.

During this forming operation the forming punch remains in a downward position holding the fastener element securely in the die. After the forming punch has engaged the partially formed element in the transfer finger the quick operating cam operates to retract the finger back into the heating cylinder at which time the heating cylinder is rotated to receive the next fastener blank. During the interval while the heating cylinder is being rotated to receive the next element blank the transfer die punch remains in downward position and the die blocks remain in inward position thereby providing sufficient time for the elements to become set on the tape.

The forming punch is operated by means of a rocker arm 77 which is mounted in a bearing 78 on a standard 79 mounted on the table top of the machine. The rocker arm is operated by a push rod 80 which rides on an operating cam 81 on the shaft 22. The die blocks 65, 66, respectively, are reciprocated by means of cams 82, 83, respectively, which are mounted on a shaft 84 and geared to shaft 22 through a gear 85. These cams have inclined side surfaces acting against rollers 86, 87 and act through rocker arms 88, 89 which are held in bearings 90, 91 underneath the table top. The rocker arms are suitably connected to the die blocks and serve to reciprocate them in timed relation with the other parts of the machine.

The tape 104 is fed through the machine from any suitable reel such as 70 which may be conveniently mounted on the table top 17. The tape is fed over a conventional tension mechanism 71 and over an idler roll 72 which roll aligns the tape properly with the setting mechanism and it is advanced through the machine over friction rolls 92 and 93. The tape is fed downwardly between the die blocks and over the roll 92, between the rolls 92 and 93. Suitable friction engagement between these rolls is obtained by means of a spring 94 which may be adjusted in conventional manner to obtain the correct friction on the tape. A suitable ratchet wheel 95 is attached to the shaft rotating roll 92 and is operated by means of a lever 96 carrying a pawl 97 and roller 98 engaging a side cam 99. The cam 99 is keyed to the shaft 84 and is positioned thereon to advance the tape during the interval when the die parts are separated.

An additional feature in properly aligning the tape between the die parts forming the fastener elements constitutes guiding flanges 73 integral with the forming punch and which straddle the tape 104 and serve to hold the tape securely within the fastener forming dies at the point where the fastener member is being formed. The transfer die punch also carries a projection 74 which forms the recess in the fastener head. To facilitate transferring the partially formed fastener element from the transfer finger to the mold parts the blanking out punch 31 is formed with a slight projection 75 which makes a slight indentation in the fastener element when it is blanked out of the strip. This slight indentation engages with the projection on the forming punch and thereby holds the blank while the transfer finger retracts and also insures the accurate positioning of the partially formed fastener element when the element is being fed downwardly into the final mold cavity. Adjacent the mold cavities in the blocks is a tape straddling plate 76 which assists in holding the stringer tape 104 properly aligned longitudinally within the mold parts. The die parts, of course, are suitably recessed to receive the tape with its edge projecting into the die cavity.

As best seen in Fig. 10 in order to insure proper setting of the element straddling the tape, suitable projections 101, 102, respectively, may be formed on the sides of the die block for clamping against and over the legs of the element while a new element is being formed in the die parts when the dies are in closed position.

In the operation of the machine, a suitable strip from which the element blanks are pressed, is fed under the blanking out punch whereupon a blank in the form of a partially complete fastener element is punched out of the strip and set into a transfer finger 40 in the heating cylinder 42. The elements set in the fingers are heated to a semi-plastic state, that is, to a temperature where they may easily be molded and yet not flow substantially at normal pressure. The dial 41 is rotated around until the finger is engaged by the quick acting transfer cam lever whereupon the semi-plastic element is transferred to the setting and die forming mechanism. When the transfer punch is over the die forming member, the forming die punch descends and sets the element into the final forming die part, as these die parts compress against the pre-heated element. At this instant as heretofore described, the element is held while the transfer finger is retracted, and the heating cylinder rotated in an anti-clockwise direction to receive the next blank. In order to speed up the setting of the elements, water may be introduced through a suitable lead pipe 100 for cooling and setting the plastic in its final set stage. When this interval has occurred the compression dies 67, 68 are separated, the forming punch is retracted, and the tape advances to receive the next element.

While I have shown and described in this application one embodiment which my invention may assume in practice, it will be understood that this embodiment is merely for the purposes of illustration and that various other forms may be devised within the scope of my invention as set forth in the appended claims.

What I claim as my invention is:

1. A machine for making fastener stringers of the class described comprising means for producing fastener member blanks of plastic material, means for preheating said blanks, forming dies for shaping said blanks to finished fastener members, means for transferring the blanks from the preheating means to said dies, and means for feeding stringer tape between said dies with a portion thereof projecting into the die cavity.

2. The process of making slide fastener stringers of the class described comprising making fastener member blanks from plastic material, preheating the same to a temperature lower than the flow temperature of the material at atmospheric pressure, and die forming said blanks in their desired position on the edge of a fabric stringer while in such heated condition.

3. The process of making slide fastener stringers of the class described comprising making fastener member blanks of plastic material, softening said blanks, transferring same into dies while in such softened state, then closing said dies, the dies having means for holding a tape stringer with a portion projecting into the die cavity and closing the dies to place the softened material under pressure around the stringer and holding the dies closed for a necessary time interval to allow sufficient hardening of the plastic material to enable it to retain its shape when the die is open.

4. The process of making slide fastener stringers of the class described comprising making fastener member blanks of plastic material, preheating the same to a molding temperature lower than the flow temperature of the material at atmospheric pressure, transferring the preheated blanks to a die in which a fabric stringer passes through the die cavity, closing the die to place the plastic material therein under pressure, and holding the die closed until said material cools sufficiently to enable it to retain its shape when the die is open.

5. A machine for making fastener stringers of the class described comprising preheating means having a plurality of recesses for preheating a plurality of blanks, means for introducing blanks into said recesses, a forming die for shaping the blanks to finished fastener members, said die having means for receiving a fastener stringer with a portion thereof projecting into the die cavity, and a quick operating transfer device for transferring the preheated blanks from the preheating means one by one to the dies, and means for advancing the tape between successive die forming operations.

6. The machine defined in claim 5 in which the time interval in the operation of the transfer device is less than one tenth of the time cycle of the machine.

7. A machine for making fastener stringers of the class described comprising means for producing partially formed fastener member blanks from strips of moldable material, a dial having a series of recesses around the periphery thereof, means on one side of the dial for introducing said partially formed blanks one in each recess as the dial moves past the same, a forming die opposite another portion of the dial, means for heating said dial and the blanks in said recesses, means for moving a heated blank from its recess when such recess is opposite the forming die and transferring it into the forming die, and means for operating the forming die.

8. A machine for making fastener stringers of the class described, comprising a dial having a plurality of recesses, means for producing partially formed fastener member blanks from strips of moldable material and introducing the same into the recesses of said dial, means for indexing said dial to bring said recesses in turn in register with said blank producing means, a forming die opposite another portion of the dial, means for maintaining the dial at a uniform elevated temperature, a transfer device for moving the blanks in turn from said recesses when the recesses are opposite the forming die and placing them in the forming die, and means for operating the forming die to form the fastener members.

9. In a machine for making fastener stringers of the class described, a forming die comprising opposed reciprocating parts with means forming a die cavity therein and having means for receiving a fastener tape between the die parts with a portion of the tape projecting into the die cavity, means for introducing a preheated blank into the die, means for closing the die and holding the same closed for a sufficient time interval to allow partial hardening of the material in the die, means for advancing the tape between successive molding operations, supplemental means for applying pressure on at least those parts of the fastener member contacting the tape after it has been moved out of the die.

10. The process of making slide fastener stringers of the class described, which stringer comprises a fabric tape and a series of fastener members attached thereto, each fastener member having a head portion and arm portions which engage the tape, which process comprises making blanks of plastic material which are generally flat and substantially Y-shaped, preheating the same to a temperature lower than the flow temperature of the material at atmospheric pressure, placing the blanks while in heated condition with the arms of the Y astride the edge of the tape, and die-forming said blanks in position on the edge of the tape.

11. In a machine for making fastener stringers of the class described, a pair of reciprocating die parts having a cavity of approximately the desired shape of the fastener member and having means to hold a fabric tape with its edge projecting into the cavity, said die being open on one side, a transfer punch for moving a blank into said die through said opening.

12. In a machine for making fastener stringers of the class described, a pair of reciprocating die parts having recesses forming a die cavity and means for holding a fastener tape with a portion of the tape projecting into the die cavity, a punch movable into the die cavity for forming a recess in the fastener member, said punch having a portion straddling the tape thereby serving as a tape guide.

13. In a machine for making fastener stringers of the class described, the combination of a pair of opposed die parts shaped to form all sides except the top face of a slide fastener interlocking member, the die cavity being open on the top side, means for moving a partially formed slide fastener interlocking member blank into position over such opening, and a forming punch mounted over the opening to engage said partially formed blank to force it downwardly into the die parts, said forming punch being of such size and shape as to close said opening.

14. The process of making fastener stringers of the class described each of which has a fabric tape and a series of fastener members closely spaced on the tape, which comprises pre-forming by a molding operation from granular material the fastener member blanks then quickly transferring the same from the molding position to a position in contact with the tape and completing the molding and forming operation while the blank is in contact with the tape.

RICHMOND ROCHESTER.